United States Patent
Burke et al.

(10) Patent No.: US 6,275,468 B1
(45) Date of Patent: Aug. 14, 2001

(54) AUTOMATIC TIMING ADJUSTMENT FOR DIVERSE ROUTING OF HFC SYSTEMS

(75) Inventors: Timothy M. Burke, Algonquin; Kurt Steinbrenner, Bartlett; Michael R. Mannette, Bloomingdale, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/690,607

(22) Filed: Jul. 31, 1996

(51) Int. Cl.[7] .................................................... H04J 3/00
(52) U.S. Cl. .................... 370/228; 370/222; 370/227; 370/237; 370/519; 340/827
(58) Field of Search ................... 370/216, 217, 370/222, 223, 225, 227, 228, 347, 514, 516, 517, 519, 224, 230, 237, 389, 318, 329, 331, 324, 238; 340/827; 348/513, 10; 359/125

(56) References Cited

U.S. PATENT DOCUMENTS

| | | | |
|---|---|---|---|
| 4,165,524 | * 8/1979 | Ninomiya | 348/513 |
| 5,146,452 | * 9/1992 | Pekarske | 370/228 |
| 5,179,548 | * 1/1993 | Sandesara | 370/222 |
| 5,307,353 | * 4/1994 | Yamashita et al. | 370/224 |
| 5,317,569 | * 5/1994 | Ralph et al. | 370/223 |
| 5,329,520 | * 7/1994 | Richardson | 370/225 |
| 5,444,692 | * 8/1995 | Basso et al. | 370/222 |
| 5,526,359 | * 6/1996 | Read et al. | 370/516 |
| 5,559,624 | * 9/1996 | Darcie et al. | 359/125 |
| 5,581,543 | * 12/1996 | Natarajan | 340/827 |
| 5,586,054 | * 12/1996 | Jensen et al. | 370/238 |
| 5,636,208 | * 6/1997 | Chang et al. | 370/347 |
| 5,671,215 | * 9/1997 | Foglar | 370/228 |
| 5,717,796 | * 2/1998 | Clendening | 370/222 |
| 5,740,166 | * 4/1998 | Ekemark et al. | 370/331 |
| 5,790,533 | * 8/1998 | Burke et al. | 370/318 |
| 5,812,549 | * 9/1998 | Sethu | 370/389 |
| 5,818,825 | * 10/1998 | Corrigan et al. | 370/329 |
| 5,826,166 | * 10/1998 | Brooks et al. | 348/10 |

* cited by examiner

Primary Examiner—Douglas Olms
Assistant Examiner—Shick Hom
(74) Attorney, Agent, or Firm—Heather L. Mansfield; Joanne N. Pappas; Romi Bose

(57) ABSTRACT

A telephony system having automatic timing adjustment for diverse routing of HFC systems has a signal stream routing through a signal line loop between a head-end and at least one communication unit. If a fault occurs within the signal line loop, recognized by the head-end when a short uplink burst from the communication unit does not align within a predetermined timing window, the head-end will cycle through predetermined delay parameters corresponding to various alternate signal line loops made up of redundant signal lines. Once the predetermined delay parameter corresponding to the current alternate signal line loop is determined, normal operation of the system resumes.

18 Claims, 1 Drawing Sheet

AUTOMATIC TIMING ADJUSTMENT FOR DIVERSE ROUTING OF HFC SYSTEMS

FIELD OF THE INVENTION

The present invention relates, in general, to wireline communication links, and in particular, to timing adjustment of communication signals along a wireline.

BACKGROUND OF THE INVENTION

In a wireline communication system, a single trunk line will service many different individual users. For instance, a telephony system will often have various trunk lines fanning out from a main control/switching station, and each of these trunk lines then fan out to individual users. Often a trunk line will run from a head-end (control station and switching network) to a service area node. Many different users will be fed to the node and then networked onto the trunk line.

These trunk lines are often fiber optic cables which are capable of carrying a tremendous number of calls in comparison to cables made of metals. These optic cables or lines can carry signals at speeds much greater than conventional metal lines.

Telephony cable lines, whether optic or metal, operate in pairs such that a trunk line will consist of a downstream cable and an upstream cable forming signal line loops for the telephony signal streams to follow. Generally the up and downstream cables are installed along the same route and have the same length, although not necessarily installed in the same trench or on the same utility line. However, these main up and downstream lines generally parallel each other.

A major goal of telephony systems is to supply dependable use to users so that the system may be accessed even during emergencies. To be reliable, the system must have backup in case a line goes down. When a line goes down, a fault is registered within the system indicating that the signal stream cannot be routed through the main signal line loop. A line can go down for many reasons including natural forces causing a break in the line, construction digging into the area where a line is laid and breaking the line, maintenance on the line by the operator, or any other number of occurrences. Accordingly, operators of telephony systems install redundant trunk lines so that the telephony signal streams may be routed through the redundant trunk lines to form an alternate signal line loop. Generally there will be a designated downstream redundant line and a designated upstream redundant line. If the main, or signal line loop downstream line is broken or disfunctional, the head-end will route the signal stream through the redundant downstream line while using the upstream line of the main, or signal line loop. Similarly, the redundant upstream line may be used in a similar manner. In fact, any combination of the four lines may be used by the head-end.

Although any combination of the four lines may be used, it should be noted that the two main lines (down and upstream) of the signal line loop usually follow the shortest path from the head-end to the service node. For reliability reasons, the redundant lines must follow a different path, often making broad detours resulting in much longer lines than the signal loop lines. Therefore, if a line of the signal line loop is near a construction site, for instance, and capable of being damaged by digging at the site, the redundant line will not be affected since its routing is away from the same area.

The longer length of the redundant line naturally delays the time that the signal stream will take to go from the head-end to the service node and back. This presents a problem with time based signaling protocols such as time division multiple access (TDMA) protocols. Delaying the time a signal stream takes to go to the service node and back beyond the delay expected as the signal follows the main signal line loop alters the anticipated position of the signal stream and control information within the stream once the signal stream returns to the head-end. Communication links are lost and an adjustment must take place to align the signal stream from the service node to the head-end to a position in the protocol that the head-end will be expecting the signal stream to be in.

Accordingly, a method is needed in a telephony system having redundant signal lines to automatically detect when a fault in a signal line loop has occurred and compensate for any delays caused by routing the signal stream through the redundant signal line.

DETAILED DESCRIPTION OF THE INVENTION

Figure 1:
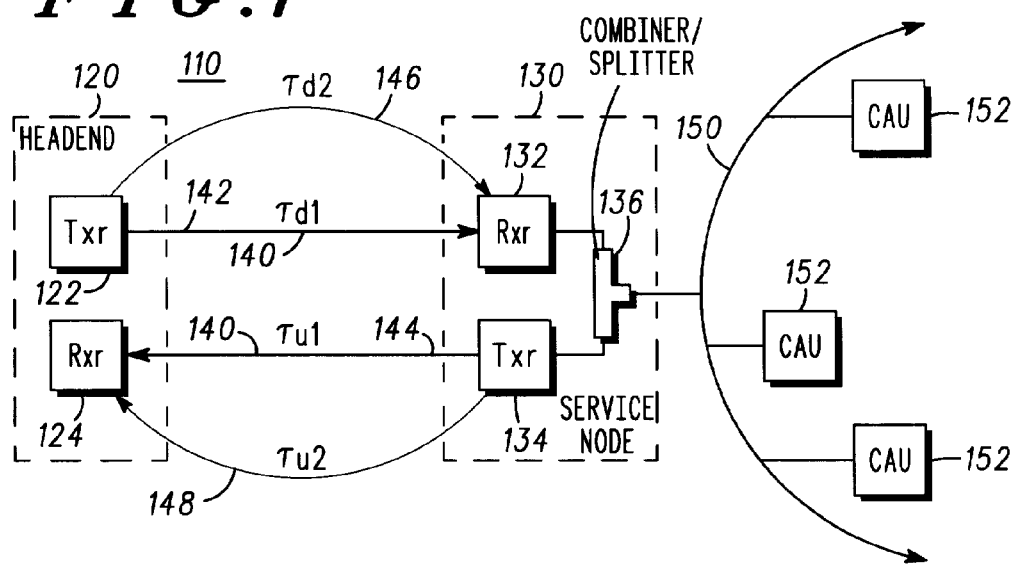
FIG. 1 is a diagram of a telephony system according to a preferred embodiment of the present invention.

FIG. 1 illustrates how a redundant signal line system in a telephony system 110 may be arranged. Under normal operating conditions, a signal stream will route from a head-end 120 to a service node 130 through a signal line loop 140. Signal line loop 140 is defined as two signal lines through which a signal stream is routed, one line, or downstream signal line 142, routing the signal stream from a transmitter 122 in head-end 120 to a receiver 132 of service node 130. A second signal line or upstream signal line 144 is routed from a transmitter 134 of service node 130 to a receiver 124 of head-end 120.

A number of communication units 152 are coupled to a cable 150 which is then coupled to combiner/splitter 136 of service node 130. Service node 130 facilitates communication between the number of communication units 152 and the telephony network 110. In a cable telephony system, the number of communication units 152 will be cable access units attached to a user's premise, be it a home or business, which allow the user two-way communication on the cable network.

As is well recognized, telephony cable lines, such as those making up signal line loop 140, are often buried in the ground. This is usually a relatively safe place for these lines and they remain undisturbed under normal conditions. However, if there is construction anywhere along the length of the line, the line can be damaged or broken causing loss of telephony service to any user connected to that signal line loop. As mentioned earlier, damage to these lines can happen because someone digging in an area is not aware of or careful about the lines, or a natural disaster breaks or damages the line. Failures may also occur in the active fiber optic transmitters and receivers, resulting in loss of service. Since telephony service is considered essential, particularly in times of emergencies, telephony operators build in redundant signal lines. Generally there is a second downstream signal line 146 and a second upstream signal line 148. These redundant signals lines will not follow the same course as the signal lines of signal line loop 140.

If for some reason one or both of the signal lines of signal line loop 140 are damaged, head-end 120 will route the signal stream through one or both of the redundant signal lines. For instance, if downstream signal line 142 is damaged, head-end 120 will route the signal stream through second downstream signal line and back up through upstream signal line 144. Similarly, if upstream signal line 144 is damaged, the upstream path of the signal stream will be through second upstream signal line 148. If both lines of the signal line loop 140 are damaged, the signal stream routes through second downstream signal line 146 and second downstream 148. In any of these cases, an alternate signal line loop is formed.

In the preferred embodiment, each of the signal lines 142, 144, 146, and 148 are optic lines made from fiber optics. A protocol used for the optic lines is a time division multiplexing (TDM) protocol on the downstream and time division multiple access (TDMA) protocol on the upstream. Accordingly, the time through each of the signal lines, or delay time, is important. The time required for the signal stream to route through one of the lines is determined and dependent upon the length of the signal line. Generally, the time required for the signal stream to route through signal line 142 will be nearly the same as the time required for the signal stream to route through signal stream 144 since the two lines are installed along the same route and generally the same length, although not required to be so. However, the time through either of the redundant lines, 146 and 148, will be much greater since the lines must follow a detoured route making the optic lines much longer.

The delay for each of the lines between head-end 120 and user service node 130 in the preferred embodiment is predetermined and stored within head-end 120. The predetermined delay parameters are determined according to the equations:

$$Delay_0 = d1/u1 = \tau_{d1} + \tau_{u1}$$

$$Delay_1 = d1/u2 = \tau_{d1} + \tau_{u2}$$

$$Delay_2 = d2/u1 = \tau_{d2} + \tau_{u1}$$

$$Delay_3 = d2/u2 = \tau_{d2} + \tau_{u2}$$

where d1 is a length of a first downstream line (142), u1 is a length of a first upstream line (144), d2 is a length of a second downstream line (146), u2 is a length of a second upstream line (148), $\tau_{d1}$ is a propagation delay for d1, $\tau_{d2}$ is a propagation delay for d2, $\tau_{u1}$ is a propagation delay for u1, and $\tau_{u2}$ is a propagation delay for u2. Therefore, if one of the signal line loop 140 lines is unusable for signal stream routing, head-end 120 will cycle through the delay parameters until it finds the delay parameter that corresponds to the alternate signal line loop formed by routing the signal stream through one of the redundant lines.

Head-end 120 must be programmed to automatically detect when one of the lines is unusable, or in other words, when a fault in a line has occurred. If a line goes down, head-end must be able to immediately reroute the signal stream through a redundant line to maintain continuous service to the users. To do so, head-end must be able to detect the fault, preferably independent of the actual rerouting mechanism.

Figure 2:
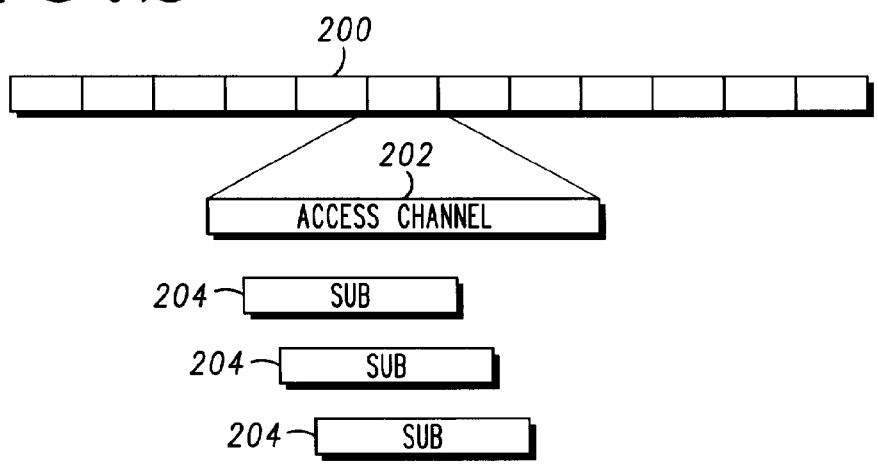
FIG. 2 is a diagram of a system protocol according to a preferred embodiment of the present invention.

FIG. 2 graphically shows how head-end 120 detects a fault in the signal lines according to a preferred embodiment of the present invention. When a given route of the signal stream is established having an associated delay, head-end 120 will expect a response, or time alignment, from the communication units 152 within a predetermined timing window 202. The response which head-end 120 will be looking for is, in the preferred embodiment, shortened uplink bursts (SUBs) (shown as elements 204 in FIG. 2 indicating that the SUBs may be anywhere within predetermined timing window 202) from the communication units 152. In the preferred embodiment, predetermined timing window 202 is an access channel 202 of the system protocol 200 as shown in FIG. 2.

Figure 3:
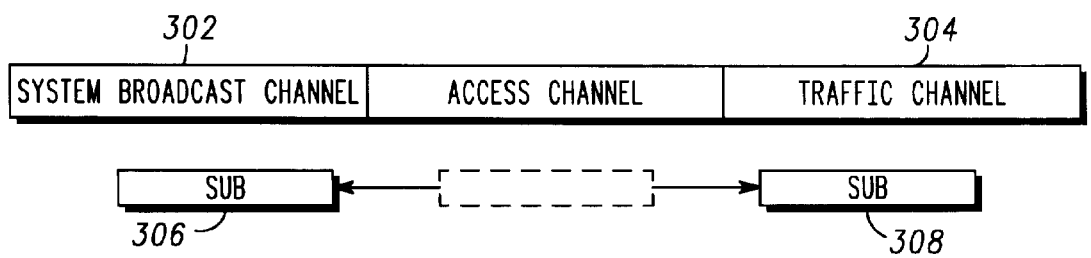
FIG. 3 is a diagram showing a portion of the system protocol of FIG. 3 according to a preferred embodiment of the present invention.

In the event that a signal line is switched, the SUBs will shift either to the left or to the right of predetermined timing window, or access channel, 202 as shown in FIG. 3. In the preferred embodiment, access channel 202 lies between a system broad-cast channel 302 and a traffic channel 304. Head-end 120 detects that the SUBs have shifted into the adjacent channels, whether system broadcast channels (indicated by 306) or traffic channels (indicated by 308).

This method of detecting a fault assumes that the head-end receiver can reliably detect that a shift has occurred by detecting the presence of shortened bursts within the adjacent channels. It also assumes that the differential signal line fixed delay is limited to a single slot time. Certainly head-end receivers can be and are designed to recognize short bursts in adjacent channels. Limiting the total fiber round trip differential between any given combination of the signal lines to approximately 60 kilometers maintains any shift in the SUBs to one slot time.

When the downlink signal to the communication units 152 is interrupted requiring a switch to a different signal line during active calls, the active communication units 152 will loose synchronization with the traffic channel 304 at the head-end 120. The active communication unit 152 will attempt to reconnect by sending the SUBs to the head-end 120. If the SUBs are within the predetermined timing window 202, head-end 120 will assign a new time alignment value to the active communication unit 152 and the call will continue.

If head-end 120 detects that the SUBs are out of bounds, it will begin cycling through the delay parameters, one at a time. For each delay parameter, head-end 120 adjusts receiver 124 of head-end 120 to the predetermined timing window to compensate for the new delay parameter. If the new delay parameter does not correlate with the current alternate signal line loop, the return SUBs from the communication units 152 will not be within predetermined timing window 202 and head-end 120 will cycle to the next delay parameter and adjust to the new delay parameter. Head-end 120 cycles through the delay parameters until the SUBs from communication units 152 are within predetermined timing window 202.

If the fault occurred in the system broadcast channel 302 (left of the predetermined timing window 202), head-end 120 will cycle through the delay parameters backwards through the list (relative to the current delay parameter, where the delay parameters are arranged in order of increasing time delay). If the fault occurred in the traffic channel 304 (right of the predetermined timing window 202), head-end 120 will cycle forward through the list. If the fault occurred within the predetermined timing window 202 (partially within predetermined timing window 202 and partially outside), then the sign of the fault (positive or negative) will determine which direction head-end will cycle through the delay parameters where positive cycles forward and negative cycles backward.

Once head-end 120 has selected the delay parameter correlating with the alternate signal line loop, the fault condition will be cleared and the system 10 will stabilize. The timing adjustment is applied to the receiver 124 of head-end 120.

In the preferred embodiment, head-end 120 cannot detect a fault unless at least one communication unit 152 is active. If none of the communication units 152 are active when a signal line is interrupted or an alternate signal line loop is established, head-end 120 will not detect a fault until at least one of the communication units 152 becomes active. At this time, the active communication unit 152 recognizes the loss of synchronization and transmit the SUBs.

A second embodiment of the present invention requires at least one communication unit 152 coupled near the service node 130 dedicated to transmitting SUBs at a constant rate. The method of detecting and correcting a fault is the same as the preferred embodiment. The dedicated communication unit 152 constantly transmits the SUBs. The advantage of the second embodiment of the present invention is that if there are no communication units 152 actively involved in calls, head-end 120 can still detect if a fault has occurred. For instance, in the middle of the night when there are no active calls, a signal line may be interrupted or broken and head-end 120 may correct for timing due to the continuous transmissions of SUBs from the dedicated communication unit 152. The disadvantage of the second embodiment of the present invention is cost. Each service node 130 requires at least one dedicated communication unit 152, and preferably two. Therefore, although the preferred embodiment of the present invention will not detect a fault during no-call periods, the disadvantage of the high cost of placing a dedicated communication unit at each service node 130 is outweighed by the inconvenience caused when an active call in initiated and must wait a second or so for the proper delay parameter to be chosen.

It should be recognized that the present invention may be used in many different sound recognition systems. All such varied uses are contemplated by the present invention.

What is claimed is:

1. A method comprising:
   determining that a signal stream has been routed through a redundant signal line when a fault of the signal stream through a signal line loop has been detected, the redundant signal line forming an alternate signal line loop, wherein the step of determining that the signal stream has been routed through a redundant signal line includes:
   receiving from at least one of a number of communication units coupled to the signal line loop a shortened uplink burst SUB;
   determining if the SUB from the at least one of the number of communication units aligns within a predetermined window of the signal stream; and
   concluding that the fault of the signal stream has occurred when the SUB does not completely align within the predetermined window of the signal stream; and
   selecting from a number of provided delay parameters a selected delay parameter corresponding to the alternate signal line loop to adjust a timing of the signal stream according to the selected delay parameter.

2. The method according to claim 1 wherein the step of selecting the selected delay parameter corresponding to the alternate signal line loop from the number of provided delay parameters comprises:
   predetermining the number of provided delay parameters according to:

$$Delay_0 = d1/u1 = \tau_{d1} + \tau_{u1}$$

$$Delay_1 = d1/u2 = \tau_{d1} + \tau_{u2}$$

$$Delay_2 = d2/u1 = \tau_{d2} + \tau_{u1}$$

$$Delay_3 = d2/u2 = \tau_{d2} + \tau_{u2}$$

where d1 is a length of a first downstream line, u1 is a length of a first upstream line, d2 is a length of a second downstream line, u2 is a length of a second upstream line, $\tau_{d1}$ is a propagation delay for d1, $\tau_{d2}$ is a propagation delay for d2, $\tau_{u1}$ is a propagation delay for u1, and $\tau_{u2}$ is a propagation delay for u2.

3. The method according to claim 2 wherein the step of selecting a delay parameter comprises cycling through each of the number of delay parameters until the SUB from the at least one of the number of communication units aligns within the predetermined window.

4. A system comprising:
   a first predetermined signal stream routing to only a signal line loop for communication between a head-end and at least one communication unit, wherein at least one communication unit sends a shortened uplink burst SUB to the head-end within a predetermined window of the signal stream such that a fault is detected when the SUB does not completely align within the predetermined window; and
   at least one redundant signal line coupled between the head-end and the at least one communication unit, the first predetermined signal stream routing to the at least one redundant signal line to form an alternate signal line loop when a fault of the first predetermined signal stream through the signal line loop is detected, wherein the head-end selects a delay parameter corresponding to the alternate signal line loop from a number of delay parameters to adjust a timing of the first predetermined signal stream according to the delay parameters when the signal stream is determined to have been routed through the at least one redundant signal line.

5. The system according to claim 4 wherein at least one communication unit comprises more than one communication unit and at least one of the more than one communication unit is dedicated to transmitting the SUB to the head-end.

6. A system comprising:
   a first signal stream routing to only a first signal line loop for communication between a head-end and at least one communication unit;
   at least one redundant signal line coupled between the head-end and the at least one communication unit, the first signal stream routing through the at least one redundant signal line to form an alternate signal line loop when a fault of the first signal stream through the first signal line loop is detected; and
   the head-end adjusting a timing of the first signal stream according to a selected one of a number of predetermined delay parameters,
   wherein the predetermined delay parameters are defined as:

$$Delay_0 = d1/u1 = \tau_{d1} + \tau_{u1}$$

$$Delay_1 = d1/u2 = \tau_{d1} + \tau_{u2}$$

$$Delay_2 = d2/u1 = \tau_{d2} + \tau_{u1}$$

$$Delay_3 = d2/u2 = \tau_{d2} + \tau_{u2}$$

where d1 is a length of a first downstream line, u1 is a length of a first upstream line, d2 is a length of a second downstream line, u2 is a length of a second upstream line, $\tau_{d1}$, is a propagation delay for d1, $\Delta_{d2}$ is a propagation delay for d2, $\tau_{u1}$ is a propagation delay for u1, and $\tau_{u2}$ is a propagation delay for u2.

7. The system according to claim 6 wherein the first signal line comprises the first downstream line and the first upstream line.

8. The system according to claim 6 wherein the at least one redundant signal line comprises the second downstream line and the second upstream line.

9. The system according to claim 6 wherein the at least one redundant signal line comprises the second upstream line.

10. A system comprising:
a signal stream routing to only an optic signal line loop for communication between a head-end and at least one communication unit;
at least one redundant optic signal line coupled between the head-end and the at least one communication unit, the signal stream routing through the at least one redundant optic signal line to form an alternate optic signal line loop when a fault of the signal stream through the optic signal line loop is detected; and
the head-end adjusting a timing of the signal stream according to a selected one of a number of predetermined delay parameters, wherein the predetermined delay parameters are defined as:

$$Delay_0 = d1/u1 = \tau_{d1} + \tau_{u1}$$

$$Delay_1 = d1/u2 = \tau_{d1} + \tau_{u2}$$

$$Delay_2 = d2/u1 = \tau_{d2} + \tau_{u1}$$

$$Delay_3 = d2/u2 = \tau_{d2} + \tau_{u2}$$

where d1 is a length of a first optic downstream line, u1 is a length of a first optic upstream line, d2 is a length of a second optic downstream line, u2 is a length of a second optic upstream line, $\tau_{d1}$ is a propagation delay for d1, $\tau_{d2}$ is a propagation delay for C2, $\tau_{u1}$ is a propagation delay for u1, and $\tau_{u2}$ is a propagation delay for u2.

11. The system according to claim 10 wherein the optic signal line loop comprises the first optic downstream line and the first optic upstream line.

12. The system according to claim 10 wherein the at least one redundant optic signal line comprises the second optic downstream line.

13. The system according to claim 10 wherein the at least one redundant optic signal line comprises the second optic upstream line.

14. A method comprising:
determining that a signal stream has been routed through a redundant optic signal line when a fault of the signal stream through an optic signal line loop has been detected, the redundant optic signal line forming an alternate optic signal line loop, wherein the step of determining that the signal stream has been routed through a redundant optic signal line includes:
receiving from at least one of a number of communication units coupled to the optic signal line loop a shortened uplink burst SUB;
determining if the SUB from the at least one of the number of communication units aligns within a predetermined window of the signal stream; and
concluding that the fault of the signal stream has occurred when the SUB does not completely align within the predetermined channel of the signal stream resulting in the signal stream routing through the redundant optic signal line; and
selecting from multiple delay parameters at least one delay parameter corresponding to the alternate optic signal line loop to adjust a timing of the signal stream according to the at least one selected delay parameter.

15. The method according to claim 14 wherein the step of selecting the at least one selected delay parameter corresponding to the alternate optic signal line loop from a number of delay parameters comprises:
predetermining the number of delay parameters according to:

$$Delay_0 = d1/u1 = \tau_{d1} + \tau_{u1}$$

$$Delay_1 = d1/u2 = \tau_{d1} + \tau_{u2}$$

$$Delay_2 = d2/u1 = \tau_{d2} + \tau_{u1}$$

$$Delay_3 = d2/u2 = \tau_{d2} + \tau_{u2}$$

where d1 is a length of a first downstream line, u1 is a length of a first upstream line, d2 is a length of a second downstream line, u2 is a length of a second upstream line, $\tau_{d1}$ is a propagation delay for d1, $\tau_{d2}$ is a propagation delay for d2, $\tau_{u1}$ is a propagation delay for u1, and $\tau_{u2}$ is a propagation delay for u2.

16. The method according to claim 15 wherein the step of selecting a delay parameter comprises cycling through each of the number of delay parameters until the SUB from the at least one of the number of communication units aligns within the predetermined window.

17. A communication unit comprising:
a transmitter sending a shortened uplink burst SUB to a head-end when a signal stream is determined to have been routed through a redundant signal line when a fault of the signal stream through a signal line loop has been detected, wherein the fault is detected when the SUB does not align within a predetermined window of the signal stream and wherein a timing of the signal stream is adjusted according to one of a number of predetermined delay parameters corresponding to the redundant signal line.

18. A communication unit comprising:
a transmitter sending a shortened uplink burst SUB to a head-end through a signal line loop;
wherein the head-end routes a signal stream through a redundant signal line to form an alternate signal line loop when a fault is detected in the signal line loop, and adjusts a timing of the signal stream according to one of a number of predetermined delay parameters corresponding to the alternate signal line loop, and
wherein the predetermined delay parameters are defined as:

$$Delay_0 = d1/u1 = \tau_{d1} + \tau_{u1}$$

$$Delay_1 = d1/u2 = \tau_{d1} + \tau_{u2}$$

$$Delay_2 = d2/u1 = \tau_{d2} + \tau_{u1}$$

$$Delay_3 = d2/u2 = \tau_{d2} + \tau_{u2}$$

where d1 is a length of a first downstream line, u1 is a length of a first upstream line, d2 is a length of a second downstream line, u2 is a length of a second upstream line, $\tau_{d1}$ is a propagation delay for d1, $\tau_{d2}$ is a propagation delay for d2, $\tau_{6\,u1}$ is a propagation delay for u1, and $\tau_{u2}$ is a propagation delay for u2.

\* \* \* \* \*